United States Patent
Marturana et al.

(10) Patent No.: US 11,861,568 B2
(45) Date of Patent: Jan. 2, 2024

(54) DATA TRACING IDENTIFIERS FOR TRACKING DATA FLOW THROUGH A DATA MODEL AND COMPUTING SERVICES

(71) Applicant: Brex, Inc., San Francisco, CA (US)

(72) Inventors: Luca Marturana, Walnut Creek, CA (US); Nikunj Yadav, San Francisco, CA (US)

(73) Assignee: Brex Inc., Draper, UT (US)

( * ) Notice: Subject to any disclaimer, the term of this patent is extended or adjusted under 35 U.S.C. 154(b) by 0 days.

(21) Appl. No.: 17/564,199

(22) Filed: Dec. 28, 2021

(65) Prior Publication Data
US 2023/0206190 A1    Jun. 29, 2023

(51) Int. Cl.
*G06Q 20/02* (2012.01)
*H04L 43/10* (2022.01)

(52) U.S. Cl.
CPC ........... *G06Q 20/027* (2013.01); *H04L 43/10* (2013.01)

(58) Field of Classification Search
None
See application file for complete search history.

(56) References Cited

U.S. PATENT DOCUMENTS

| | | | |
|---|---|---|---|
| 2012/0197788 A1* | 8/2012 | Sanghvi | G06Q 30/02 705/40 |
| 2015/0006714 A1* | 1/2015 | Jain | H04L 63/1425 709/224 |
| 2015/0009990 A1* | 1/2015 | Sung | H04L 12/4633 370/392 |
| 2015/0296007 A1* | 10/2015 | Ogrinz | H04L 43/08 709/219 |
| 2018/0062962 A1* | 3/2018 | Pignataro | H04L 43/026 |
| 2021/0081271 A1* | 3/2021 | Doshi | G06F 11/0772 |
| 2021/0119892 A1* | 4/2021 | Kant | G06F 11/3447 |

* cited by examiner

*Primary Examiner* — Bruce I Ebersman
*Assistant Examiner* — Matthew Cobb
(74) *Attorney, Agent, or Firm* — Haynes and Boone, LLP (57) ABSTRACT

There are provided systems and methods for data tracing identifiers for tracking data flow through a data model and computing services. An entity, such as company or business, may provide computing services. When providing these services, one or more computing services, processors, or the like of the service provider's computing architecture may be used. This may include processing data through a data processing flow that uses multiple computing services. To automate data tracing through a data processing flow and corresponding computing services, a data library may be used to create and inject data trace identifiers to a message header associated with the data to be processed. This may be propagated with the data to other and/or centralized computing services, which may then persist the identifier with the data in a data table column for a standardized data model. These mappings may be stored by the centralized computing services.

20 Claims, 5 Drawing Sheets

```
create table data_traces  ~302
    id VARCHAR[255] NOT NULL PRIMARY KEY,
    entity_type VARCHAR[255] NOT NULL,
    entity_id VARCHAR[255] NOT NULL,             } 304
    trace_id VARCHAR[255] NOT NULL,
    inserted_at TIMESTAMP NOT NULL,
    updated_at TIMESTAMP NOT NULL,
}
```

```
data class Entity (
    val type: String
    val id: String
)

interface DataTracingContext {
    /**
     * Get current trace id based on http headers or entity if passed.   } 306
     * It will check that both match and setup forwarding.
     */
    fun traceId(entity: Entity? = null): String?

/**
     * Logs traceId for an entity, it will use the traceId forwarded   ~308
     * available or create a new one.
     * If a new one needs to be created, it automatically sets it up forwarding
     * to other services.                                                                                                   } 310
     * Most applications will only need to call this when creating a new entity in the database.
     */
    fun logTraceId(entity: Entity): String
}
```

DATA TRACING IDENTIFIERS FOR TRACKING DATA FLOW THROUGH A DATA MODEL AND COMPUTING SERVICES

TECHNICAL FIELD

The present application generally relates to tracing data when propagated through a data model and computing services of computing infrastructures and more specifically to using data tracing identifiers injected to a header of the data that is used to trace the data using a centralized identifier library.

BACKGROUND

Service provider systems may provide services to customers, such as businesses and companies, through computing systems and networks. In some embodiments, the service providers may provide electronic transaction processing that may include credit or loan underwriting that may extend a credit balance or loan to customers, including business entities. For electronic transaction processing provided to users, businesses, and/or companies, the service provider may also provide transaction processing, accounting, expense management, and the like. In order to provide these services, data processing flows may utilize different data processors, microservices, decision services, and/or other computing services to process data by the service provider systems. However, a high-level data processing flow may implement various computing services that may each store the data to a corresponding database. This causes inconsistency in tracking and tracing the data between different computing services and data models for the services. In order to attempt to trace the data, multiple queries and data keys may be required, which is time consuming and unnecessarily utilizes data processing and querying resources.

Therefore, there is a need to address deficiencies with conventional computing systems used by service providers to trace data processed between different systems and computing resources to reduce data processing times and queries.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for using data tracing identifiers to track data flow through a data model and computing services. Systems suitable for practicing methods of the present disclosure are also provided.

In service provider systems, such as credit provider systems and other financial service providers, underwriting systems may be utilized to extend credit or other loans to customers and other entities, such as businesses and companies, based on risk assessment and risk analysis processes performed by the service provider systems. The online service provider may also provide an account, credit, and/or expense management system that may provide data aggregators that receive and monitor data for an entity, as well as connect with one or more financial computing systems for financial accounts. These service providers may further be utilized for electronic transaction processing, for example, with debit, credit, or other payment card transactions, direct debit/credit through automated clearing house (ACH), wire transfers, gift cards, and other types of funding sources that may be issued to the entity by the service provider and/or other financial service providers (e.g., banks). Thus, a networked system and provider may include a framework and architecture to provide payment gateways, billing platforms, eCommerce platforms, invoicing, and additional services. However, with large and complex computing architectures and infrastructures that provide these services, multiple data processing stacks, applications, computing services and processors, and/or corresponding data models for databases and data tables may be needed. This causes inefficiencies when querying for and tracing data that may not be easily identified and/or share corresponding hash keys, identifiers, or the like to allow for fast data tracking.

In order to solve these issues with data tracing through different data models and their corresponding computing services, the service provider may implement a data trace system and includes identifiers, operations, and a library that may be used to track and trace data as it is processed by data processors, microservices, decision services, and/or other computing services of the service provider and/or persisted in a unified data model of the computing services. For example, a data model may correspond to an organization of data elements that standardizes the data elements and assists in designating their relationships, such as data storage to data tables, as well as data flow and/or processing. The library may provide operations to create and write Data Trace Identifiers (data trace ids or "DTIs" as used herein) to a data table for a database of the library. Thereafter, the DTIs may be used with data as transmitted between and/or processed by different computing services for a high-level data processing flow of the service provider (e.g., an underwriting request, a payment card transaction, etc.). Thus, a unified data model may standardize where and/or how the DTIs are stored in one or more data tables of databases used by computing services (e.g., through a specific column). This allows for querying and tracing of the data throughout the service provider's computing systems and architecture in a faster and simplified manner.

For example, a credit and underwriting provider system may offer services, software, online resources and portals, and infrastructure used to provide underwriting for the entity's (e.g., a business or company) available credit or loans, as well as operations for expenses, purchases, and other financial transactions. Initially, the entity may be onboarded by providing necessary documents to verify the entity's identity and/or business standing, such as incorporation documents, EIN, tax status and/or documents, and the like. In order to be processed for credit underwriting, the entity may further be required to provide certain data regarding the entity's financial status, accounts, and balances, such as initial seed money, investments, and global available balance(s) that may be used for repayment of extended credit or loans. In this regard, the entity may provide access or a link to, such as through an integration with one or more banking systems utilized by the entity, one or more available balances of funds.

Once onboarded for credit and/or payment services, one or more payment instruments may be issued to users or employees of the entity, including sales, management, information technologies, or other users, such as, contractors, affiliates, or owners (hereinafter referred to generally as users or employees). The payment instruments may correspond to various types of payment cards and/or account identifiers, which may be issued by the service provider system or by an associated partner (e.g., an issuing bank that provides credit cards or other financial instruments). During the course of business, an employee may engage in commerce with one or more merchants using a payment instrument, such as by making an in-person (e.g., at a merchant location or store) or online purchase from the merchant. Thus, the user may request electronic transaction processing through the account number or payment instrument identifier(s) provided to the user. Merchants (e.g., a seller or payment receiver, such as a business, fundraiser, healthcare provider, landlord, etc.) may correspond to any person or entity selling goods and/or services (referred to herein as an "item" or "items").

When processing a payment, the credit provider system may receive transaction data for the payment request from the payment network, for example, when the acquirer (e.g., the acquiring bank for the merchant that processes the payment instrument provided by the user) requests processing with the issuer (e.g., the issuing bank of the entity and/or credit provider system that issues the payment instrument). This occurs when the user causes a transaction to be generated, and the merchant generates a total for the transaction request, which the user can pay for by providing a payment instrument to the merchant. After receiving the payment instrument, the merchant may cause a payment request to be generated for payment of the transaction. In various embodiments, the user may be required to enter additional checkout information, such as a name, delivery location, or other personal or financial information that may be included in the transaction data for the transaction. In some embodiments, the payment instrument may previously be tokenized by the expense management system in order to further protect from fraud, where the digital token allows for backend identification of the payment instrument to the issuer and/or expense management system without exposing payment credentials.

The credit provider system may provide an electronic data processing framework that integrates into a payment network and/or computing system of a financial service provider at a point that allows for real-time data acquisition and/or periodic data retrieval and/or updating of available balances for financial accounts of the entity. For example, integration of the framework at a network node or point at or between an issuing and/or acquiring bank for one or more payment networks may allow for data about accounts and balances for an entity to be received in real-time, and thus the framework may perform real-time data processing. The data for financial accounts, balances, and/or transactions may also be acquired at certain intervals, such as from a pull and/or retrieval for the request from the corresponding banking system for the entity. Additionally, the system's framework may integrate with one or more client devices (e.g., personal computers, mobile devices, etc.), online scheduling resources, personnel management systems, and/or enterprise business software to receive data for an entity that is associated with financial accounts, balances, and/or processed transactions. The payment networks may correspond to resolution networks for payment processing using an account identifier, payment card, or the like during electronic and in-person transaction processing. These payment networks and financial service providers (e.g., banks and banking computing systems) may be selected and integrated in order to determine and process account and/or transaction data.

Thus, the service provider may have a large and/or complex computing architecture that is used to provide these computing services to users. As data is processed through a data processing flow, multiple computing services may process the data and/or persist to one or more corresponding databases. In order to trace data between different services and the data model, initially the service provider may be configured with a data tracing library that utilizes DTIs for data tracing. A user or an entity may initiate a data processing flow. For example, a user may enter a deposit transaction to deposit an amount of funds to one or more accounts. This may engage a deposits processor, which may require a verification processor or service to request verification, and then an ACH service may initiate the deposit. The data for this deposit transaction and/or an identifier for this data may be stored by each of these processors and/or services by one or more databases and using the unified data model.

When using the data tracing library, a DTI is created and/or written by the data tracing library to a commonly accessible and/or shared database for the library. As data is shared, transmitted, and/or processed by different computing services, the DTI may be propagated with the data and/or to the corresponding computing services for the data. This may be done using Hypertext Transfer Protocol (HTTP) headers or the like. For example, the DTI may be injected to, written to and/or included in a header for a request, response, or other message associated with the data. This HTTP message and header having the DTI may be shared by the data trace library with each of the computing services handling the data during the data processing flow. When sharing DTI via the HTTP message and header with the computing services for the data, remote procedure call (RPC) interceptors may be used to inject, write, or add the DTI to the message or header. In this regard, RPC interceptors may correspond to components of an RPC application, where, before a message (e.g., HTTP message) is sent or received by a client or server, allow for interaction with the message (e.g., by adding or injecting the DTI to the header when transmitted or included with the data). This allows propagation of the DTI throughout the computing services using the HTTP header associated with the data.

Thereafter, as the data is transmitted to and/or processed by the separate components, processors, micro and/or decision services, and other computing services, the DTI may be separately stored by each computing service. Each computing service may have one or more corresponding databases having data tables for a data model corresponding to the computing service. The data model may therefore include data tables with columns for different data parameters or features and rows for data entries. The data library may create and generate a database table across the computing services that includes a column for recording and persisting the DTI with the corresponding data model. This allows each data model for each service to record and store the DTI in a column for each data row entry.

In some embodiments, a one-to-many relationship for data to DTIs may occur. For example, data may enter the service provider's systems through one or more data processing flows and/or input channels for computing services. Thus, each data row for a data entry may include multiple DTIs or other traces (e.g., through the same or multiple columns of the data tables for the data model). This allows a one-to-many relationship to occur between data and different DTIs, which may allow for tracing of the data through different data processing flows, computing services, and the data model that may use the data. Further, this may allow for connecting different data processing flows by determining the different DTIs that are associated with the same data.

Thereafter, the data trace library may be used to identify the data (e.g., by the data, an identifier, hash key, or the like) and DTI. This may then be used to trace the corresponding computing services for the data model utilizing and recording the data, which may allow for determination of faulty services, where sensitive or secure data may be recorded, and/or during system troubleshooting. Further, for compliance with regulations and policies, data tracing may be used to determine the processing stacks, services, and/or databases that may be exposed to certain data during data processing. By utilizing a centralized data trace library, the service provider may determine a pathway of data through computing systems in a faster and more coordinated manner by reducing the need for multiple data queries from separate computing services and databases. This reduces the processing requirements and resources required to trace data through data processing flows. Further, the amount and/or number of keys required to identify data may be reduced, which saves consumption of data storage resources.

Figure 1:
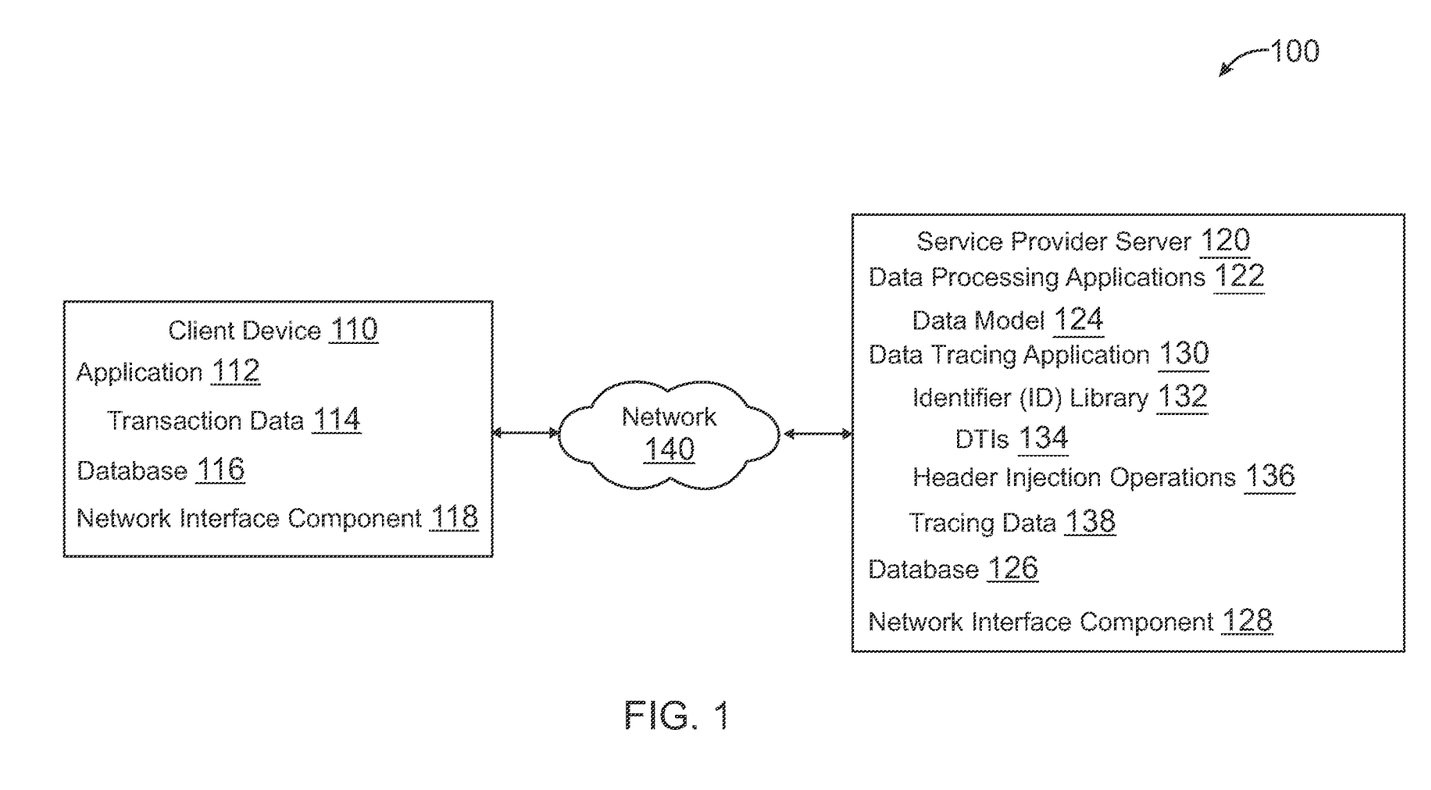
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a customer or client device 110 and a service provider server 120 in communication over a network 140. A user (not shown) may correspond to an employee, contractor, shareholder, or other suitable person of a company (not shown and generally referred to herein as an "employee") associated with client device 110, which may be used to utilize the services provided by service provider server 120. Service provider server 120 may process data from client device 110, such as during underwriting, account generation or usage, electronic transaction processing, expense management, or the like. In this regard, service provider server 120 may provide data tracing operations using a centralized library and DTIs shared via HTTP or other message header for data.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be utilized by an employee, contractor, affiliate, or owner of an entity or company that employs one or more users, for example, to utilize services provided by service provider server 120. For example, in one embodiment, client device 110 may be implemented as a personal computer (PC), telephonic device, a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. In this regard, client device 110 includes one or more processing applications which may be configured to interact with service provider server 120. Although only one communication device is shown, a plurality of communication devices may function similarly.

Client device 110 of FIG. 1 includes an application 112, a database 116, and a network interface component 118. Application 112 may correspond to executable processes, procedures, and/or applications with associated hardware. In other embodiments, client device 110 may include additional or different modules having specialized hardware and/or software as required.

Application 112 may be implemented as specialized hardware and/or software utilized by client device 110 to access and/or utilize services provided by service provider server 120, such as underwriting for credit, onboarding and/or management of an account, electronic transaction processing, and/or usage of other services with service provider server 120 by an entity associated with client device 110 (e.g., an organization, business, company, or the like including startup companies that may require credit services). For example, a user associated with the entity may utilize client device 110 to provide data and/or request data processing for data from service provider server 120. In this regard, application 112 may correspond to software, hardware, and data utilized by a user associated with client device 110 to enter, store, and process data with service provider server 120, such as transaction data 114. Transaction data 114 may be processed via one or more data processing flows, which may utilize computing services storing data and/or DTIs for tracing the data using the data model for databases associated with the computing services. Thus, transaction data 114 may be provided to and/or processed with service provider server 120 with the DTIs for data tracing using a data library, as further discussed herein. In other embodiments, the services may further include email and messaging, social networking, microblogging, media sharing and/or viewing, streaming, and/or other data processing services.

In various embodiments, application 112 may include a general browser application configured to retrieve, present, and communicate information over the Internet (e.g., utilize resources on the World Wide Web) or a private network. For example, application 112 may correspond to a web browser, which may send and receive information over network 140, including retrieving website information, presenting the website information to the user, and/or communicating information to the website, including payment information. However, in other embodiments, application 112 may include a dedicated software application of service provider server 120 or other entity. Application 112 may be configured to assist in onboarding for accounts, establishing and maintaining the accounts, engaging in electronic transaction processing, and services provided by service provider server 120.

Client device 110 may further include database 116 stored in a transitory and/or non-transitory memory of client device 110, which may store various applications and data and be utilized during execution of various modules of client device 110. Database 116 may include, for example, identifiers such as operating system registry entries, cookies associated with application 112, identifiers associated with hardware of client device 110, or other appropriate identifiers, such as identifiers, tokens, and/or fingerprints for devices, applications, accounts, and/or users. Database 116 may further include transaction data 114 and the like, which may be uploaded, automatically or on command, for processing by service provider server 120 using one or more data processing flows.

Client device 110 includes at least one network interface component 118 adapted to communicate with service provider server 120 and/or another device or server. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices.

Service provider server 120 may be maintained, for example, by an online service provider, which may provide onboarding services for account, credit or loan underwriting services, payment and transaction processing services, and/or expense management services to companies, businesses, and other entities. In this regard, service provider server 120 includes one or more processing applications which may be configured to interact with client device 110 and other devices or servers to facilitate provision of the services and tracing of data through the services using DTI with a data trace library. In one example, service provider server 120 may be provided by BREX®, Inc. of San Francisco, CA, USA. However, in other embodiments, service provider server 120 may be maintained by or include other types of credit providers, financial services providers, and/or other service provider, which may provide services to users and entities.

Service provider server 120 of FIG. 1 includes data processing applications 122, a data tracing application 130, a database 124, and a network interface component 128. Data processing applications 122 and data tracing application 130 may correspond to executable processes, procedures, and/or applications with associated hardware. In other embodiments, service provider server 120 may include additional or different modules having specialized hardware and/or software as required.

Data processing applications 122 may correspond to specialized hardware and/or software to allow entities (e.g., the entity associated with client device 110) to provide account services, provide credit or loan extensions via underwriting models and/or services, process payments and transactions using one or more payment cards or other financial instruments, provide expense management systems, and/or provide additional services to users and/or entities. Data processing applications 122 may correspond to one or more services provided by service provider server 120 to an entity, such as the entity associated with client device 110. In some embodiments, the services may include account and/or credit services. In such embodiments, data processing applications 122 may include underwriting systems and models, which may extend credit or other loans based on parameters for an entity. Using the accounts and/or credit, electronic transaction processing services may also be provided to users and entities via data processing applications 122. In further embodiments, data processing applications 122 may provide expense management services, such as those that may integrate with an entity's expense, payroll, human resources, business panning, and the like to provide enterprise resource planning (ERP) services.

In some embodiments, the services may be used to receive payment instruments associated with a bank account, extended credit, and/or funding of the company, such as one or more company credit cards. In this regard, an entity may first establish an account with data processing applications 122 by providing company or entity data and onboarding through data processing applications 122. The company or entity data may include IRS EIN information and/or other information that may be utilized to verify a company, business, organization, or other entity. Such information may further include bank account and funding information, such as verified funding from investors, available funds in a bank or financial account, and the like. If qualified based on policies, rules, and/or models, service provider server 120 may onboard the entity associated with client device 110 for services provided by service provider server 120. This may include credit extended to the entity based on entity financial data. In this regard, service provider server 120 and/or another issuing entity may provide a payment instrument that is managed by data processing applications 122. For example, service provider server 120 may issue one or more credit cards for employees of the entity, which may correspond to a real or virtual credit card or other types of payment instruments and instrument identifiers that may be used for company payments.

For example, data processing applications 122 may be used to process transaction data 114 from client device 110, which may include information about the transaction (e.g., cost, items, additional fees including tax or tip, merchant identifier, description, and the like), an identifier for the entity associated with client device 110, and/or the used payment instrument (e.g., credit card number for the credit account). Data processing applications 122 may then utilize one or more payment networks to process the transaction, such as by issuing a payment over a payment network and/or by requesting payment by a credit issuing bank or institution to the merchant and/or acquiring bank or institution. In other embodiments, the credit card and payment network may be managed by another entity and/or payment network, where an integration by service provider server 120 with the network may allow for acquisition of transaction data by data processing applications 122 in real-time or substantially in real-time. Data processing applications 122 may further issue transaction histories for transaction data 114 and provide accounting and recordation of transaction data, such as with the ERP resources provided by data processing applications 122.

Data processing applications 122 may include computing services that correspond to one or more data processing stacks, components, processors, microservices, and/or decision services of service provider server 122 to provide these services utilized by client device 110 and/or other devices or servers. The computing services may correspond to different computing systems and/or processors of service provider server 120 that may provide a data processing service and/or operation. For example, the computing services may be associated with login, authentication, transaction processing, verification, risk and/or fraud detection, payment networks and/or ACHs, and the like. Each of the computing services may further utilize a database, which may have and/or utilize data model 124 for persisting data, hash keys from data, data identifiers, data processing results or outputs, and the like, as well as one or more of DTIs 134 from a data trace or identifier library 132 of data tracing application 130. Data model 124 and the corresponding databases using data model 124 may further be configured by data trace library 132 to include one or more columns for recording and persisting DTIs 134 (e.g., to a data table or the like) when received in an HTTP header for an HTTP request, response, or other message associated with the data for processing. In this regard, the HTTP header may be injected with one of DTIs 134 and/or the DTI added or written to the HTTP using an RPC interceptor during transmission and/or receipt of the data for processing by the computing services, as discussed herein. Other media may also be used to transfer DTIs 134 including headers of messages in Advanced Message Queuing Protocol (AMQP) or in Kafka, as well as any combination thereof in systems that may utilize a hybrid manner of communication. Thereafter, when recording the data processing of the data, the corresponding one of DTIs 134 may be stored by data model 124 to a corresponding database for each computing service.

Data tracing application 130 may correspond to specialized hardware and/or software to allow end users, administrators, data scientists, engineers, compliance officers, and other users associated with service provider server 120 to trace data processed by data processing applications 122 through different computing services using data trace library 132 with data model 124, which may also be provided to the entity associated with client device 110 entities where data tracing may be provided as an external service. In some embodiments, data tracing may allow tracking and/or tracing a pathway of data as transmitted, processed, and/or utilized by different components and computing services of data processing applications 122. For example, data model 124 may be used to designate and/or determine a particular process and/or standard for storing data including DTIs 134. This may include standardizing and/or formatting data tables and other data storage structures for databases to include one or more columns for DTIs 134 that are identifiable and readable by data tracing application 130. Thus, data tracing application 130 may utilize data trace library to create and/or configure databases of service provider server 120, such as those used by data processing applications 122, in order to be compatible with storing, writing, allowing reading, and/or retrieving DTIs 134 during data processing and/or data tracing.

Data trace library 132 may be used to create, generate, and/or share DTIs 134 during data processing flows for data through the computing services of data processing applications 132. For example, as data enters to the system and/or a data processing operation is requested for existing data, one or more data processing flows may be used to process the data using one or more computing services of data processing applications 132. Data trace library 132 may also act as a centralized repository and/or database for DTIs 132, which may be used for lookup and query of DTIs for corresponding data. Thus, data trace library may include one or more columns for data rows that may be used to store and record DTIs 132. These columns and other data tables may be configured by and/or to correspond with data model 124. Once generated, DTIs 134 may be stored by the corresponding centralized database for data trace library 132. Data trace library 132 may share DTIs 134 by injecting or adding DTIs 134 to an HTTP or other message header by header injection operations 136 when the data flows and/or is transmitted between computing services of data processing applications 122.

Header injection operations 136 may use RPC interceptors to perform injection of DTIs to headers after the HTTP message for corresponding data is sent by a computing service and/or received by another computing service in order to cause the computing services to receive and store DTIs 134 when processing the data. Thus, DTIs 134 may be used to identify and trace data as the data is processed through different computing services of data processing applications 122 during one or more data processing flows. Thereafter, tracing data 138 may correspond to a query and result of a request to trace data using one of DTIs 134. Tracing data 138 may include an identified pathway, identified computing services and/or components, and/or identified databases where data flowed during a data processing flow. This may be identified by querying databases for one of DTIs 134 using data trace library 132 and one or more data tracing queries and/or operations. The operations and features of data tracing application 130 with data processing applications 122 is described in further detail with regard to FIGS. 2-4 below.

Additionally, service provider server 120 includes database 126. As previously discussed, the user, entity, and/or entity corresponding to client device 110 may establish one or more accounts with service provider server 120. Account data stored by database 126 may include customer credit accounts and other entity information, such as name, address, entity organization and/or formational information (e.g., incorporation, tax, and/or good standing documents), funding information (e.g., bank balances and/or incoming funding), additional user financial information, and/or other desired entity data. Further, database 126 may also correspond to multiple databases of service provider server 120, which may include databases using or configured by data model 124. These databases may be used by different computing services and therefore store data tables for data used by the computing services and associated with DTIs 134.

In various embodiments, service provider server 120 includes at least one network interface component 128 adapted to communicate with client device 110 and/or other devices or servers over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices.

In various embodiments, one or more of the devices, systems, and/or components of system 100 may one or more computing systems or architectures of a banking or financial institution that may provide data when processed by service provider server 120, such as in response to a request for client device 110. For example, the financial institutions may include a computing system and/or network utilized for funding balances within accounts, such as bank and/or financial accounts of funds available to business entities.

The financial institution(s) may further provide resolution of payment requests and electronic transaction processing, which may be governed by permissions (e.g., acceptances and denials) of payment requests for transaction processing by service provider server 120. In this regard, the financial institution(s) may provide one or more accounts that include balances available to an entity associated with account holder device 110, such as bank accounts and other accounts that include assets of the business entity. A financial institution may correspond to an acquiring and/or issuing bank or entity that may hold accounts for users and/or assist in resolving payments.

Network 140 may be implemented as a single network or a combination of multiple networks. For example, in various embodiments, network 140 may include the Internet or one or more intranets, landline networks, wireless networks, and/or other appropriate types of networks. Network 140 may correspond to small scale communication networks, such as a private or local area network, or a larger scale network, such as a wide area network or the Internet, accessible by the various components of system 100.

Figure 2:
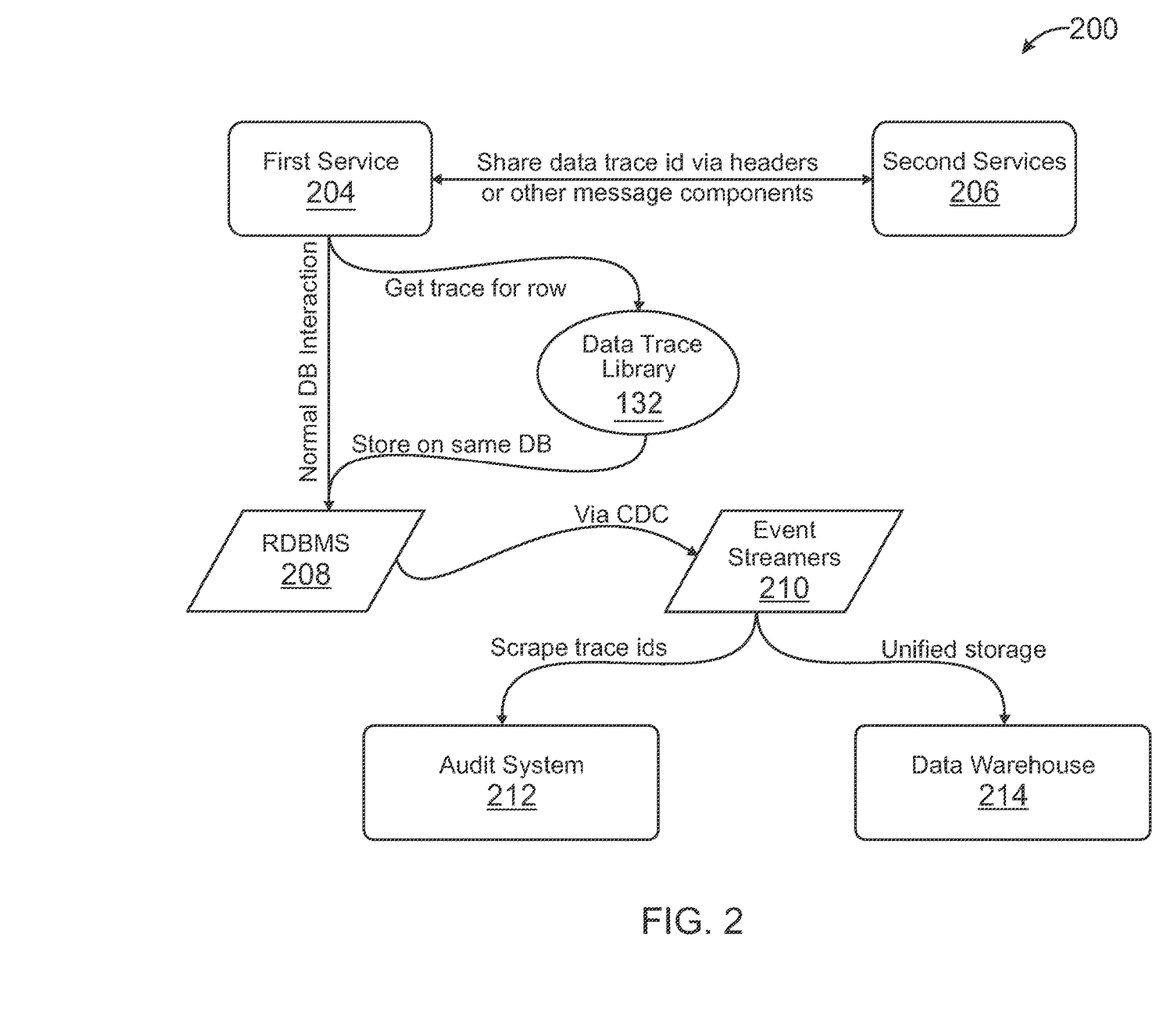
FIG. 2 is an exemplary system architecture for generating, sharing, and storing Data Trace Identifiers using a data tracing library for data tracing between computing services, according to an embodiment.

FIG. 2 is an exemplary system architecture 200 for generating, sharing, and storing Data Trace Identifiers using a data tracing library for data tracing between computing services, according to an embodiment. System architecture 200 includes data trace library 132 corresponding to a component of data tracing application 130 for service provider server 120 discussed in reference to system 100 of FIG. 1. In this regard, data trace library 132 may allow for interactions with different computing services, databases, and components of a computing architecture for a service provider in system architecture 200. For example, HTTP requests, responses, or other messages may be exchanged during a data processing flow that are associated with the data to be processed, for example, via one or more application programming interface (API) calls of different computing services and the like. Data trace library 132 may inject a DTI to one or more HTTP headers or other message components during data exchange or transmission, which may allow the DTIs to be persisted by different computing services using, processing, and/or storing the data in order to provide data tracing through a unified data model.

For example, a data model may be used to configure data trace library 132 with different databases and/or database systems used by a first service 204 and second services 206, including a relational database management system (RDBMS) 208. RDBMS 208 may correspond to PostgreSQL, or Postgres, as well as other types of RDBMS systems that allow for users and/or systems to collect, store, and access data (e.g., via one or more data tables). RDBMS 208 may be used by data trace library 132 to store DTIs for data, which allows for lookup, data tracing through different computing services (e.g., first service 204 and/or second services 206), and DTI querying from different databases and/or data tables. In this regard, the data model may be used to configure and/or unify data trace library 132 and RDBMS 208 so that databases used by data trace library 132, first service 204, and/or second services 206 are compatible with using data trace ids or DTIs. This may be done by utilizing one or more columns that may persist an identifier, key, or the like for the DTI associated with corresponding data processed by one or more of first service 204 and/or second services 206. Further, this may include creating and/or adding a column for DTIs to the data tables that record data processing transactions and/or other data processing inputs, outputs, and/or events.

Initially, first service 204 may receive, retrieve, or otherwise obtain data for processing through a data processing flow. The data processing flow may further utilize second services 206. In order to create a DTI for the data, first service 204 may interact with data trace library 132 in order to obtain a data trace id or DTI for a row associated with an instance of a data processing flow and/or other data (e.g., a payment card transaction). Data trace library 132 may respond by creating a DTI for the particular processing event or instance and corresponding data. Thereafter, first service 204 may perform a normal or standard database interaction with RDBMS 208 to store the data for the data processing flow in the row for the instance, where data trace library 132 may further store the newly create DTI on the same database for first service 204 in the same row in a column for DTI tracing. Next, RDBMS 208 may interact with event streamers 210, such as Apache Kafka, which may share streams of events occurring between applications. This may be done via a change data capture that allows for streaming of database changes. Event streamers 210 may allow for an audit system 212 to scrape DTIs for auditing and data validity, security, and/or integrity. Additionally, a unified storage may be provided with a data warehouse 214, such as Snowflake.

In order to propagate the DTI for the data during the data processing flow, such as to later trace where the data flowed through first service 204, second services 206, and/or other computing services and/or databases, HTTP and/or HTTPS traffic may be utilized to share the DTI via headers or other message components. For example, data trace library 132 may cause, inject, and/or write the DTI for the corresponding data to a corresponding HTTP header for HTTP traffic between first service 204 and second services 206. The HTTP traffic may occur where data is being transmitted and/or exchanged during a data processing flow, such as to process the data to return a response or result to a user or entity. When shared via HTTP header, the DTI may be recorded in databases and/or data tables, such as in the column for DTIs for a row that identifies the next computing service that receives, processes, and/or stores the DTI.

Later, the DTI may be retrieved from one of the databases or data tables used by data trace library 132, first service 204, and/or second services 206. An internal database query may be generated for, executed on, and queried by available databases and/or data tables (e.g., a structured query language (SQL) query where RDBMS 208 may correspond to Postgres) using the DTI. By identifying the corresponding data records (e.g., rows in the data tables) using the DTI column(s), the corresponding data records, databases, and/or computing services may be identified, which allows for later identification of where the data was used, processed, and/or stored, as well as rebuilding of a data processing flow. Further, if the rows include multiple DTIs in one or more columns for DTIs corresponding to the data and data record of the data processing instance, multiple different data flows through the components and/or computing services of the service provider's computing architecture may be determined. This allows a one to-many approach of the data to the DTI(s), respectively, which allows for connecting different data processing flows that may use the same data during a high-level data processing request or flow (e.g., a payment card transaction, which may implement several different actions and flows).

Figure 3:
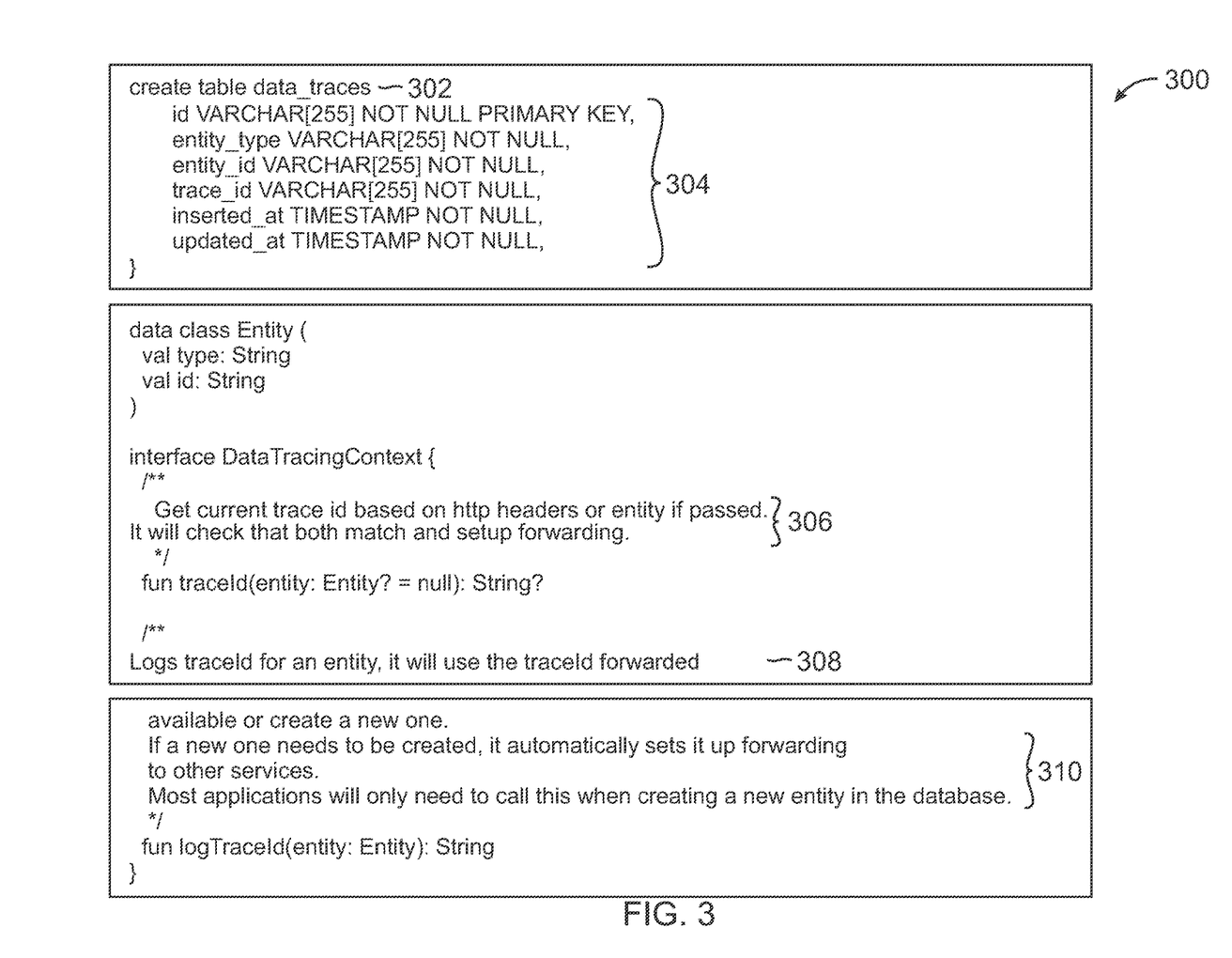
FIG. 3 is an exemplary diagram of pseudocode for library details to generate and use a Data Trace Identifier with data tracing between computing services, according to an embodiment.

FIG. 3 is an exemplary diagram 300 of pseudocode for library details to generate and use a Data Trace Identifier with data tracing between computing services, according to an embodiment. Diagram 300 of FIG. 3 includes a representation of pseudocode that may be used when providing DTIs and a data trace library by service provider server 120 using data tracing application 130 discussed in reference to system 100 of FIG. 1. In this regard, the pseudocode of diagram 300 may be executed by data trace library 132 discussed in reference to system architecture 200 of FIG. 2.

Diagram 300 includes a create DTI table operation 302 to create data trace identifier data tables and/or one or more columns in data tables for databases that may be used to record and persist DTIs when data is processed by one or more computing services. For example, databases and data tables may be used to record data processing operations, including inputs, outputs and/or other actions associated with when data is processed by a computing service during a data processing flow. In order to standardize the data tables and/or format for a unified data model, create DTI table operation 302 may be used in order to provide table standardization request 304. In table standardization request 304, a DTI column may be created for an entity type, identifier, and timestamp of data recordation in one or more rows of a data table. This allows a data trace library and computing services to utilize a unified data model that allows DTIs to be recorded between different tables.

Further in diagram 300, DTI recordation operations 306 may be used by a data trace library and/or computing services in order to persist DTIs when transmitted to and/or received by computing services during data processing. For example, a log operation 308 may be used during DTI recordation operations 306 to record DTIs to data tables in a column that is standardized to the data model used by the different computing services. Further, the data trace library may execute DTI creation operation 310 in order to create DTIs. During DTI creation operation 310, if a new DTI is required, one may be created. Otherwise, if one already exists, a DTI may be accessed for the data and/or data processing flow instance, which may then be used with the data during data processing by one or more computing services. This may be then automatically forwarded via HTTP headers to computing services during data processing. The data trace library may be used to automatically forward DTIs across services using both server and/or client-side RPC interceptors and the like.

Figure 4:
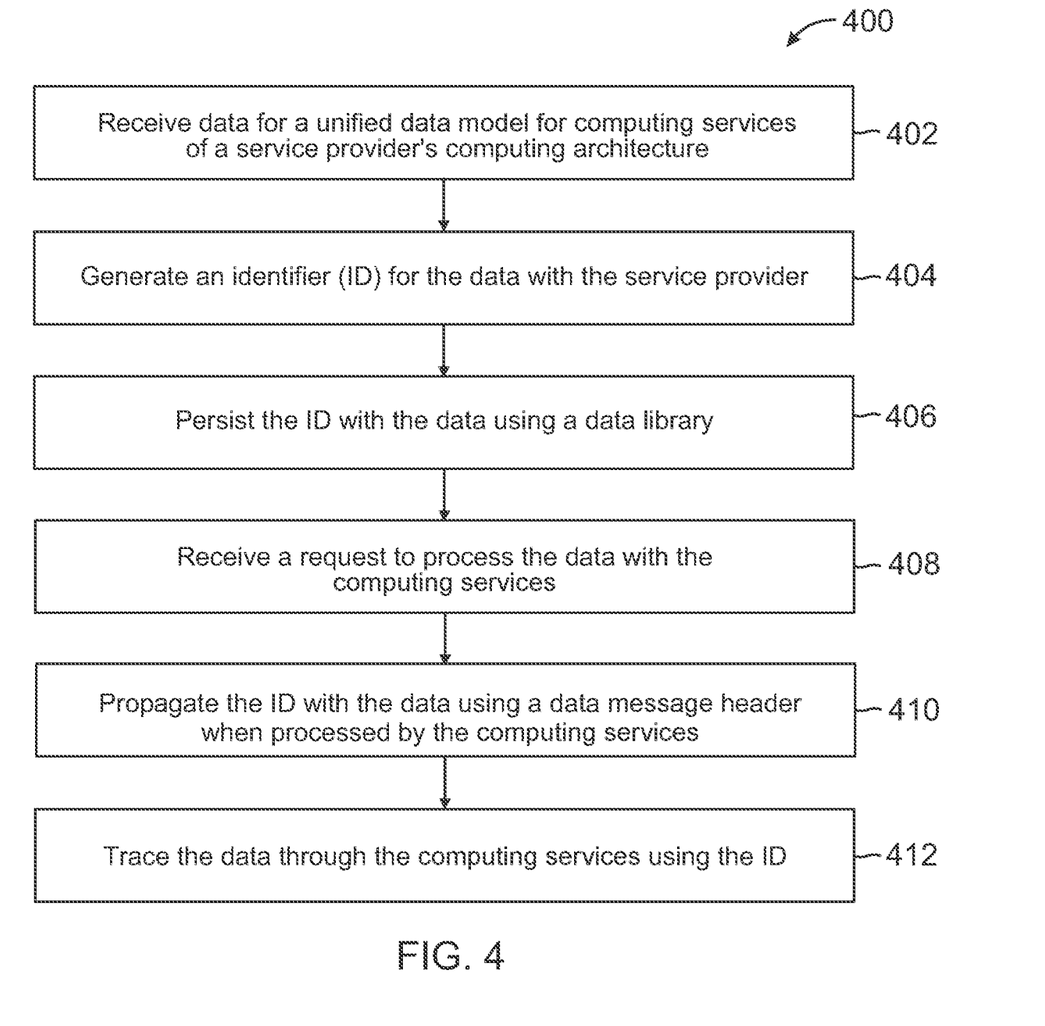
FIG. 4 is an exemplary flowchart for data tracing identifiers for tracking data flow through a data model and computing services, according to an embodiment.

FIG. 4 is an exemplary flowchart 400 for data tracing identifiers for tracking data flow through a data model and computing services, according to an embodiment. Note that one or more steps, processes, and methods of flowchart 400 described herein may be omitted, performed in a different sequence, or combined as desired or appropriate.

At step 402 of flowchart 400, data for a unified data model for computing service of a service provider's computing architecture is received. The data may be associated with a high-level data processing flow, which may utilize one or more sub-flows for processing the data and providing a result or output to a user. For example, a payment card transaction may be received, which may include different data processing flows. One flow may be associated with authentication and risk, while others may be associated with payment network usage and payment. For the data, an identifier (ID), such as a DTI associated with data tracing and a data trace library, is generated for the data with the service provider, at step 404. The ID may be generated by a data trace library and recorded to an RDBMS or other databases (e.g., no-relational databases) for the service provider, which may include databases and/or data tables for data recordation.

At step 406, the ID is persisted with the data using a data library. For example, a row may be created in a data table for the RDBMS or other databases, where the row is associated with the data and/or the data processing flow instance for the data. The row may include a column, which corresponds to recording one or more DTIs. Thus, the data, an identifier for the data and/or processing instance, and/or a hash or key for the data and/or processing instance may be recorded in the row, where the column for the DTI(s) records the DTI created for the instance. Where multiple processing flows may process the data, multiple DTIs may be created and stored in one or more columns for the DTIs. This may allow a one-to-many matching of the DTIs to the data when different processing flows are invoked, which allows for connecting, linking, and/or stitching together different processing flows that use the same data.

At step 408, a request to process the data with the computing services is received. For example, a first service may process the data, such as a validation service. Thereafter, a second service for a payment processor may be invoked. Each may separately be invoked to process the data, where the data is then requested by and/or transferred to the corresponding service. At step 410, the ID is propagated with the data using a data message header when processed by the computing services. For example, an HTTP request, response, and/or message may include an HTTP header or other element, which allows for injecting and/or writing of the ID to the header. This message may be associated with and/or shared during the data processing by the different computing services. This allows the DTI to be shared between different computing services.

At step 412, the data is traced through the computing services using the ID. For example, after data processing, the data may be required to be traced between different computing services. This may be required for compliance reasons, troubleshooting, and/or determination of faulty computing services and/or data processing. Further, the tracing may be used to determine data processing flows using the data based on a higher-level data processing request and flow. Thus, the data trace library may be used to obtain the ID and perform database queries using the ID to determine where the ID occurs. Thereafter, the different computing services may be identified using the ID queries.

Figure 5:
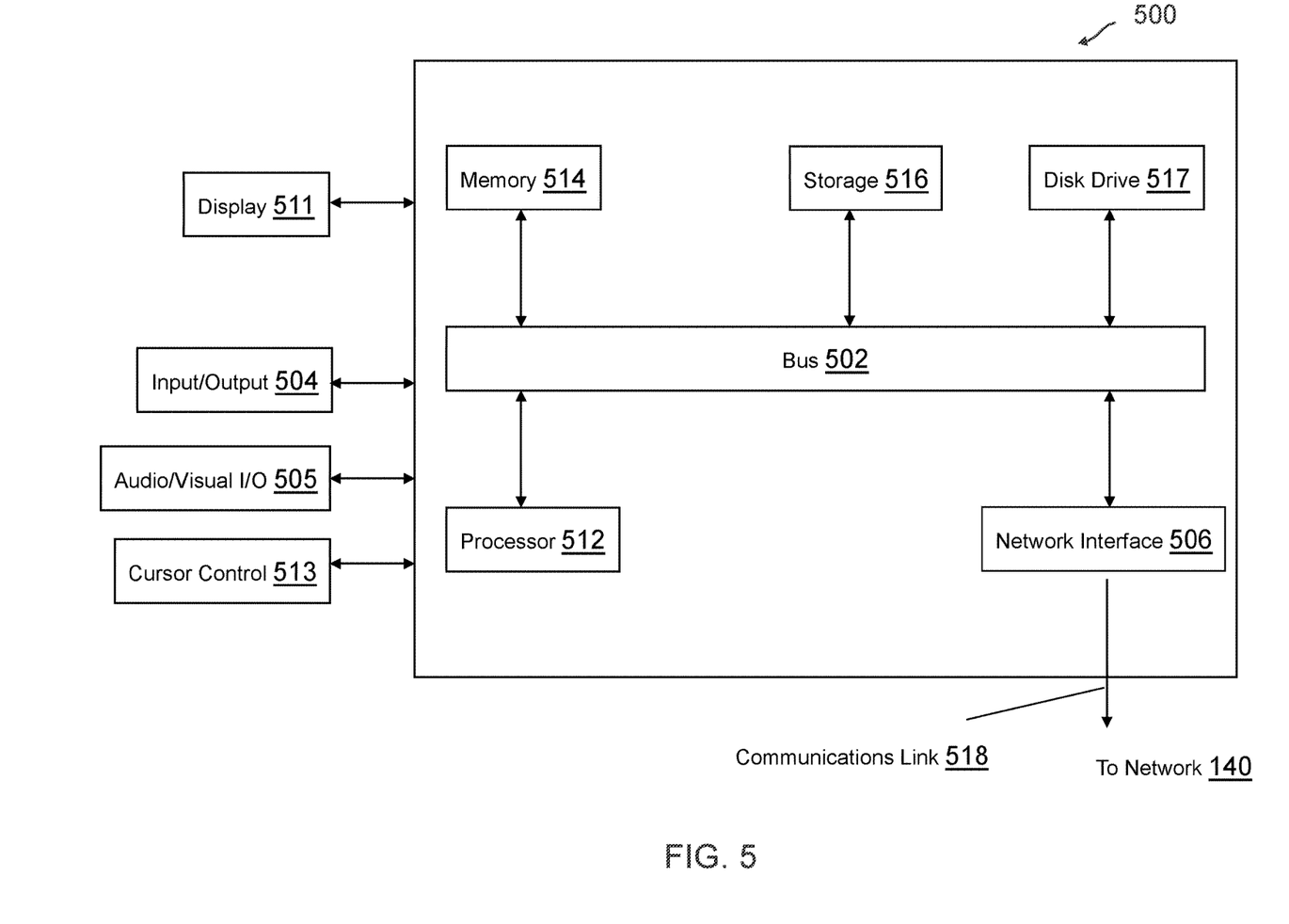
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
receiving data for a data processing flow using at least one of a plurality of computing services associated with a service provider, wherein the plurality of computing services share a unified data model for data storage by corresponding databases of the plurality of computing services;
generating a data trace identifier (ID) for the data based at least on the unified data model for the data storage, wherein the data trace ID comprises information particular to the data;
writing the data trace ID to a data library for the plurality of computing services of the service provider, wherein the data trace ID is written to a data table of the data library that is accessible by the plurality of computing services during the computing service;
propagating the data trace ID with the data through the plurality of computing services during a use of the data processing flow with the service provider, wherein the propagating comprises injecting, using a remote procedure call (RPC) interceptor, the data trace ID to a message header of a message associated with the data during the use of the data processing flow;
creating individual records for the data trace ID in the corresponding databases of the plurality of computing services based on the propagating;
querying the corresponding databases for the data trace ID;
determining ID tracing data based on the data storage by corresponding databases of the plurality of computing services;
standardizing, in a data format for the unified data model, the ID tracing data for the data trace ID in the data library;
writing the standardized ID tracing data to the data library in association with the data trace ID, wherein the data library comprises additional ID tracing data for the data trace ID from at least one additional data processing pathway;

determining that the data is processed by the plurality of computing service of the service provider using a plurality of data processing flows based on the writing and the data library;

connecting, based on the standardized ID tracing data and the additional ID tracing data, the data processing pathway associated with the data that is processed by a subset of the plurality of computing services with the at least one additional data processing pathway; and identifying, based on the data processing pathway, one of the subset of the plurality of computing services that causes a data processing issue with the data for the computing services.

2. The system of claim 1, wherein the propagating further comprises:

injecting, to an HTTP header, the data trace ID when processing the data by one or more of the plurality of computing services or transmitting the data between the plurality of computing services.

3. The system of claim 1, wherein the operations further comprise:

tracing the data through at least two of the plurality of computing services using the data trace ID from the data library during a plurality of data processing operations performed by the plurality of computing services with the data.

4. The system of claim 1, wherein the data library enables data tracing between the plurality of computing services, and wherein the plurality of computing services are associated with at least two data processing flows for the data with the computing service.

5. The system of claim 1, wherein the data library is accessible by the plurality of computing services, and wherein the data trace ID from the data library is propagated with the data during one or more data processing operations of the data by the plurality of computing services.

6. The system of claim 1, wherein the propagating the data trace ID with the data further comprises:

responsive to the writing the data trace ID to the data library, adding the data trace ID to one or more additional headers prior to or when transmitting the data between the plurality of computing services.

7. The system of claim 1, wherein the data processing flow utilizing the data comprises one of a payment card transaction, an account transaction utilizing an account, a debit to the account, or a deposit to the account.

8. A method comprising:

receiving data for a data processing flow using at least one of a plurality of computing services associated with a service provider, wherein the plurality of computing services share a unified data model for data storage by corresponding databases of the plurality of computing services;

generating a data trace identifier (ID) for the data based at least on the unified data model for the data storage, wherein the data trace ID comprises information particular to the data;

writing the data trace ID to a data library for the plurality of computing services of the service provider, wherein the data trace ID is written to a data table of the data library that is accessible by the plurality of computing services during the computing service;

propagating the data trace ID with the data through the plurality of computing services during a use of the data processing flow with the service provider, wherein the propagating comprises injecting the data trace ID to a message header of a message associated with the data during the use of the data processing flow;

creating individual records for the data trace ID in the corresponding databases of the plurality of computing services based on the propagating;

querying the corresponding databases for the data trace ID;

determining ID tracing data based on the data storage by corresponding databases of the plurality of computing services;

standardizing, in a data format for the unified data model, the ID tracing data for the data trace ID in the data library;

writing the standardized ID tracing data to the data library in association with the data trace ID, wherein the data library comprises additional ID tracing data for the data trace ID from at least one additional data processing pathway;

determining that the data is processed by the plurality of computing service of the service provider using a plurality of data processing flows based on the writing and the data library;

connecting, based on the standardized ID tracing data and the additional ID tracing data, the data processing pathway associated with the data that is processed by a subset of the plurality of computing services with the at least one additional data processing pathway; and identifying, based on the data processing pathway, one of the subset of the plurality of computing services that causes a data processing issue with the data for the computing services.

9. The method of claim 8, wherein the propagating comprises:

injecting, to an HTTP header, the data trace ID when processing the data by one or more of the plurality of computing services or transmitting the data between the plurality of computing services.

10. The method of claim 8, wherein the method further comprises:

tracing the data through at least two of the plurality of computing services using the data trace ID from the data library during a plurality of data processing operations performed by the plurality of computing services with the data.

11. The method of claim 8, wherein the data library enables data tracing between the plurality of computing services, and wherein the plurality of computing services are associated with at least two data processing flows for the data with the computing service.

12. The method of claim 8, wherein the data library is accessible by the plurality of computing services, and wherein the data trace ID from the data library is propagated with the data during one or more data processing operations of the data by the plurality of computing services.

13. The method of claim 8, wherein the propagating the data trace ID with the data further comprises:

responsive to the writing the data trace ID to the data library, adding the data trace ID to one or more additional headers when transmitted between the plurality of computing services.

14. The method of claim 8, wherein the data processing flow utilizing the data comprises one of a payment card transaction, an account transaction utilizing an account, a debit to the account, or a deposit to the account.

15. A non-transitory machine-readable medium having stored thereon machine-readable instructions executable to cause a machine to perform operations comprising:
  receiving data for a data processing flow using at least one of a plurality of computing services associated with a service provider, wherein the plurality of computing services share a unified data model for data storage by corresponding databases of the plurality of computing services;
  generating a data trace identifier (ID) for the data based at least on the unified data model for the data storage, wherein the data trace ID comprises information particular to the data;
  writing the data trace ID to a data library for the plurality of computing services of the service provider, wherein the data trace ID is written to a data table of the data library that is accessible by the plurality of computing services during the computing service;
  propagating the data trace ID with the data through the plurality of computing services during a use of the data processing flow with the service provider, wherein the propagating comprises injecting the data trace ID to a message header of a message associated with the data during the use of the data processing flow;
  creating individual records for the data trace ID in the corresponding databases of the plurality of computing services based on the propagating;
  querying the corresponding databases for the data trace ID;
  determining ID tracing data based on the data storage by corresponding databases of the plurality of computing services;
  standardizing, in a data format for the unified data model, the ID tracing data for the data trace ID in the data library;
  writing the standardized ID tracing data to the data library in association with the data trace ID, wherein the data library comprises additional ID tracing data for the data trace ID from at least one additional data processing pathway;
  determining that the data is processed by the plurality of computing service of the service provider using a plurality of data processing flows based on the writing and the data library;
  connecting, based on the standardized ID tracing data and the additional ID tracing data, the data processing pathway associated with the data that is processed by a subset of the plurality of computing services with the at least one additional data processing pathway; and
  identifying, based on the data processing pathway, one of the subset of the plurality of computing services that causes a data processing issue with the data for the computing services.

16. The non-transitory machine-readable medium of claim wherein the propagating comprises:
  injecting, to an HTTP header, the data trace ID when processing the data by one or more of the plurality of computing services or transmitting the data between the plurality of computing services.

17. The non-transitory machine-readable medium of claim 15, wherein the operations further comprise:
  tracing the data through at least two of the plurality of computing services using the data trace ID from the data library during a plurality of data processing operations performed by the plurality of computing services with the data.

18. The non-transitory machine-readable medium of claim 15, wherein the data library enables data tracing between the plurality of computing services, and wherein the plurality of computing services are associated with at least two data processing flows for the data with the computing service.

19. The non-transitory machine-readable medium of claim 15, wherein the data library is accessible by the plurality of computing services, and wherein the data trace ID from the data library is propagated with the data during one or more data processing operations of the data by the plurality of computing services.

20. The non-transitory machine-readable medium of claim wherein the propagating the data trace ID with the data further comprises:
  responsive to the writing the data trace ID to the data library, adding the data trace ID to one or more additional headers when transmitted between the plurality of computing services.

* * * * *